April 21, 1936.  C. H. ANGELL  2,037,873

SELF SEATING SLEEVE TYPE VALVE

Filed June 12, 1931

INVENTOR
CHARLES H. ANGELL
BY *Frank L. Belknap*
ATTORNEY

Patented Apr. 21, 1936

2,037,873

UNITED STATES PATENT OFFICE 2,037,873

SELF-SEATING SLEEVE-TYPE VALVE

Charles H. Angell, Chicago, Ill., assignor, by mesne assignments, to Universal Oil Products Company, Chicago, Ill., a corporation of Delaware Application June 12, 1931, Serial No. 543,766

4 Claims. (Cl. 251—77)

This invention relates to a valve for controlling the flow of fluids and particularly refers to an improved type of valve which cleans its own seating surface during the closing and opening operation.

Difficulties have been encountered with valves of the usual type when used in lines or conduits handling materials which leave deposits upon the seating surfaces of the valve. The difficulties are particularly severe when the deposited material is of a hard nonplastic character or of a resinous or pitchy character, tending to cling to the surface upon which it accumulates, as such materials clinging to the seating surface of a valve prevents proper sealing of the seating members and permits leakage through the valve when in a closed position. Large accumulations of any foreign material within the valve also tends to obstruct free movement of the valve seating members as well as restricting the flow of fluids through the valve.

The present invention provides a special type of valve devised primarily for the purpose of overcoming the difficulties above mentioned. The primary concepts of the invention comprise a valve wherein the seating surfaces are cleaned during the closing and/or the opening operation by a cutting action between the seating members of the valve.

A more specific embodiment of the invention may comprise a valve having, as the movable seating member, a sleeve which both rotates and slides, said sleeve preferably being sharpened along its lower edge and providing, by the simultaneous lowering and rotation of said sleeve during the closing operation, means for shearing away materials deposited upon the stationary seating member of the valve, within which the sleeve rotates and slides in a downward direction to block the flow of fluid through the valve.

The attached diagrammatic drawing illustrates one specific form which the principles of the present invention may assume.

Figure 1:
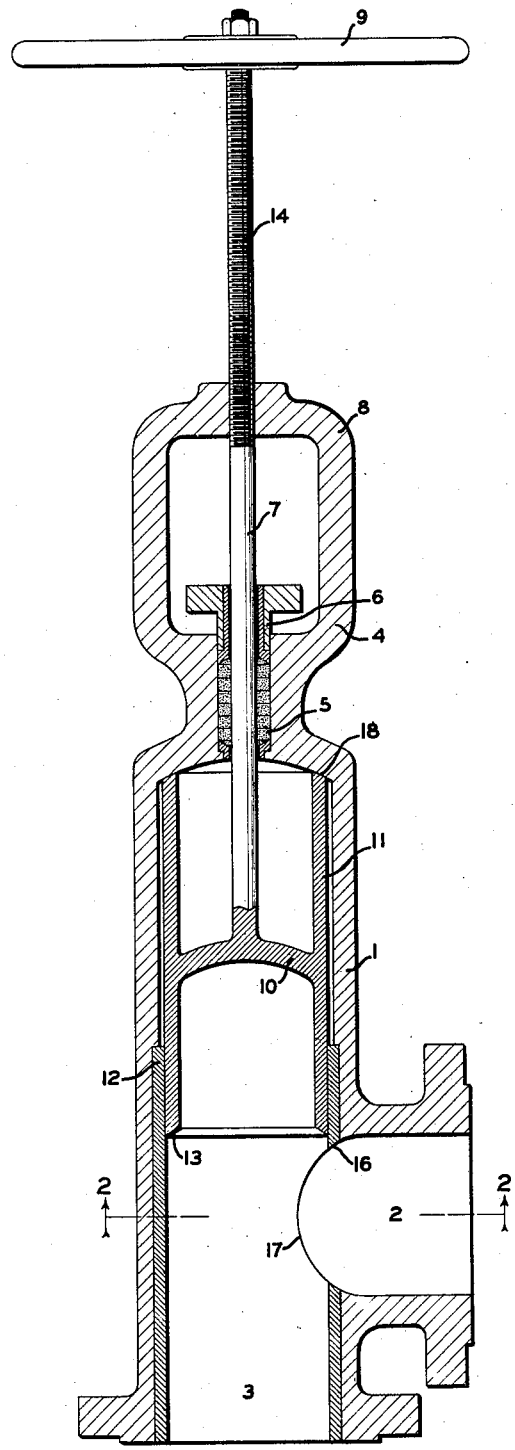
Figure 1 is a cross-sectional side elevation of the valve taken along a vertical plane passing through the center line of the valve.
Figure 2:
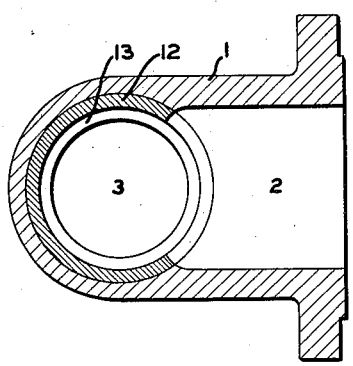
Figure 2 is a horizontal section taken on the line 2—2 in Fig. 1.
Figure 2A:
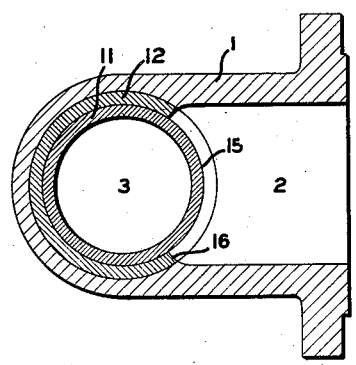

Figure 2—A is a similar sectional view but with the movable seating member or sleeve of the valve in a lowered or closed position, blocking the passage of fluid through the valve.

The main body of the valve is indicated at 1. The inlet port is indicated at 2 and the outlet port at 3 and, in the particular valve here illustrated, these ports are adjoining and at right angles to each other, forming what is termed an angle valve. It should be understood that the principles of the invention are equally applicable to any other type of valve although the type illustrated is the preferred form.

The upper portion of the valve body comprises a bonnet 4 which, while shown in the drawing as an integral part of the main body of the valve 5 may, if desired, be flanged or otherwise fastened thereto. The valve bonnet 4 has a packing gland 5 and a follower 6 which may be of any conventional type suitable for sealing the valve against leakage around the valve stem 7. The upper portion of valve stem 7 is threaded through a yoke 8, comprising the upper portion of bonnet 4, and a hand-wheel 9 of any conventional type is attached to the upper end of stem 7.

The lower end of valve stem 7, terminating within the body of the valve, is attached by means of a web or dome 10 to a sleeve 11. While member 10 may, if desired, simply comprise a web or spokes connecting valve stem 7 to sleeve 11, it is preferably an imperforate partition or dome separating the upper portion of the valve body from the lower portion, through which lower portion the fluid handled by the valve must pass. This prevents said fluid reaching the upper portion of the valve body, thus preventing the deposition of materials from said fluid within said upper portion of the valve body and also serving to maintain packing gland 5 at more nearly atmospheric conditions than would otherwise prevail when the fluid handled is under other than atmospheric conditions.

Sleeve 11 is preferably snugly fitted into a liner 12 comprising the stationary seat member of the valve and disposed within the valve body. The sleeve 11 and liner 12 are preferably machined to a close fit and may, if desired, be lapped in with valve grinding compound in much the same manner as a piston is fitted to a cylinder. Allowance is preferably made in the fitting of sleeve 11 and liner 12 for expansion or contraction which may result in case the valve is to be operated at high or low temperatures. In case the character of the fluid to be transmitted through the valve is such that a deposit of material such as, for example, coke or carbonaceous material may collect upon the entire unprotected surface of liner 12, it may not be necessary for sleeve 11 to fit snugly within liner 12 as when sleeve 11 is lowered to close the opening through valve port 2 it will cut its own way into the deposited coke or carbonaceous material, thus providing a seal of such coke or carbonaceous material within the relatively small space between sleeve 11 and liner 12. The lower edge of sleeve 11 is preferably sharpened at an angle, as indicated in the drawing at 13, in such a manner that when sleeve 11 is rotated and lowered, by rotation of hand-wheel 9, the sharpened edge 13 will shear away any obstructing material which may accumulate upon the inner surface of liner 12. Valve stem 7 is preferably threaded, as indicated at 14, with a fine thread, i. e., a thread having a small pitch or lead, so that the angle of rotation of sleeve 11 will be large in proportion to the vertical movement of the sleeve, thus facilitating the shearing action of the sharpened edge 13.

When the valve is closed, sleeve 11 is in a lowered position such that it completely blocks the passage of fluid through port 2, as indicated in Figure 2—A. With the sleeve in this position it will be evident that material, such as that deposited upon the surface of liner 12 when the valve is open, may be deposited, with the valve in a closed position, upon that portion of the surface of sleeve 12 exposed to said fluid, this surface being indicated in Figure 2—A at 15. This deposited material will, however, be cut away upon opening the valve by the shearing action of the sharp edges 16 surrounding the opening 17, in liner 12, which corresponds with inlet port 2 in the valve body. The edges surrounding port 17 may, if desired, be straight, i. e., with a 90° angle to the axis of port 17 or parallel with the side walls of port 2, or they may preferably be sharpened at an angle, as illustrated in the drawing.

In the event that sleeve 11 is not closely fitted within liner 12 but depends upon the material deposited on the inner surface of liner 12 to seal the space between the sleeve and the liner, as previously described, the upper end of sleeve 11 preferably seats upon the under side of bonnet 4, as indicated at 18, so that when the valve is fully opened, packing gland 5 is sealed from contact with the fluid passing through the valve, especially when such fluid is at a high temperature or pressure, or both. When the valve is in other than a fully opened position, the material left upon the inner surface of sleeve or liner 12 to seal the space between sleeve 11 and liner 12 will, of course, serve to seal the upper portion of the valve body from the fluid transmitted through the valve.

As a specific example of one of the many uses to which a valve of the type illustrated may be applied to advantage and as an example of the operation of the valve, when so used: A valve such as illustrated is placed in each of two branches of the discharge or transfer line from the heating element of a hydrocarbon oil conversion process. The two branches of this transfer line discharge into separate reaction chambers which are operated alternately, the valve in the branch leading to one chamber being closed, while the valve in the branch leading to the other chamber is open. When it becomes necessary to switch the stream of heated hydrocarbon oil from the chamber which is being operated to the chamber which has been prepared for operation, the closed valve is gradually opened and the opened valve is gradually closed until the stream of heated oil is completely diverted from the chamber which has been in use to the alternate chamber. The valve which has been open, permitting the stream of hydrocarbon oil to flow therethrough, will have accumulated coke or carbonaceous material upon the inner surface of the stationary seating member or liner of the valve, while the valve which has been closed, blocking the passage of oil therethrough, will have accumulated a similar deposit of coke or carbonaceous material upon that portion of the surface of the movable seating member or sleeve of the valve which is exposed to the oil, said exposed portion being adjacent to the inlet port of the valve. In the valve which is being closed, the shearing action of the sharpened lower edge of the sleeve, as it rotates and slides in a downward direction to a closed position, will cut away the deposited coke or carbonaceous material upon the seating surface of the liner and preferably the valve is mounted directly over the reaction chamber so that the coke or carbonaceous material cut away from within the valve will fall directly into the chamber. In the valve which is being opened, the deposited coke or carbonaceous material which has accumulated upon that portion of the sleeve adjacent to the inlet port of the valve will be cut away by the shearing action of the sharp edges surrounding the inlet port in the liner, such material being swept into the main body of the valve by the stream of hydrocarbon oil passing therethrough and flowing therewith into the reaction chamber. It will be evident from the foregoing that the reaction chambers of the cracking process may be alternated at will by manipulation of the valves, the one which is closed effectively blocking the flow of oil to the chamber not in use, while the valve which is open offers no obstruction or restriction to the flow of oil to the chamber in use.

I claim as my invention:

1. In combination, a valve comprising a body provided with adjoining conduits, a sleeve lining the inner surface of one of said conduits adjacent the point of juncture with the other conduit, means movable within said sleeve for controlling communication between said conduits, the portion of said sleeve defining the juncture with the adjoining conduit being tapered to form a shearing edge, and the ends of said movable means also being tapered to form a shearing edge.

2. A valve comprising, in combination, a valve body provided with communicable inlet and outlet ports, a sleeve movable along the walls of said valve body, one end of said sleeve being sharpened to form a shearing edge bearing against the walls of said valve body and the portion of the valve body surrounding the inner end of one of said ports being sharpened to form a shearing edge bearing against the surface of said sleeve.

3. A valve comprising, in combination, a valve body provided with communicable inlet and outlet ports, a liner within a portion of said valve body adjacent said inlet port, a sleeve both reciprocatively and rotatably movable within said liner to control communication between said ports, the lower edge of said sleeve being sharpened to form a shearing edge bearing against said liner, a port through said liner corresponding to said inlet port in said valve body and a sharpened edge surrounding said liner port which forms a shearing edge adapted to bear against the surface of said sleeve.

4. In combination, an angle valve casing, a stationary sleeve therein, a communicating inlet and outlet port for said casing, a rotatably and reciprocatively movable closure member for said inlet slidably mounted within said sleeve, and sharpened shearing edges associated with one end of said closure member and the portion of said sleeve adjacently surrounding said inlet for cleaning the bearing surfaces of said sleeve and closure member during movement of the latter.

CHARLES H. ANGELL.